(12) United States Patent
Hackl

(10) Patent No.: US 11,789,884 B2
(45) Date of Patent: Oct. 17, 2023

(54) BUS SYSTEM AND METHOD FOR OPERATING A BUS SYSTEM

(71) Applicant: ams AG, Premstätten (AT)

(72) Inventor: Heinz-Werner Hackl, Weiz (AT)

(73) Assignee: AMS AG, Premstätten (AT)

( * ) Notice: Subject to any disclaimer, the term of this patent is extended or adjusted under 35 U.S.C. 154(b) by 0 days.

(21) Appl. No.: 17/774,719

(22) PCT Filed: Oct. 30, 2020

(86) PCT No.: PCT/EP2020/080540
§ 371 (c)(1),
(2) Date: May 5, 2022

(87) PCT Pub. No.: WO2021/089430
PCT Pub. Date: May 14, 2021

(65) Prior Publication Data
US 2022/0398208 A1      Dec. 15, 2022

(30) Foreign Application Priority Data

Nov. 7, 2019   (EP) .................................... 19207730

(51) Int. Cl.
G06F 13/40        (2006.01)
G06F 13/362       (2006.01)

(52) U.S. Cl.
CPC ........ G06F 13/4027 (2013.01); G06F 13/362 (2013.01)

(58) Field of Classification Search
CPC .......................... G06F 13/4027; G06F 13/362
See application file for complete search history.

(56) References Cited

U.S. PATENT DOCUMENTS

| | | | |
|---|---|---|---|
| 5,828,856 A * | 10/1998 | Bowes | G06F 13/28 710/308 |
| 6,687,773 B1 | 2/2004 | Stewart et al. | |
| 8,543,838 B1 * | 9/2013 | Au | G06F 21/78 713/190 |
| 2002/0138678 A1 * | 9/2002 | Kim | G06F 13/364 710/240 |
| 2004/0177205 A1 | 9/2004 | Schoner | |
| 2004/0212607 A1 * | 10/2004 | Tomiyasu | G06F 3/14 345/204 |

(Continued)

OTHER PUBLICATIONS

International Search Report and Written Opinion for corresponding International Application No. PCT/EP2020/080540 dated Feb. 3, 2021, 8 pages.

(Continued)

Primary Examiner — Nimesh G Patel
(74) Attorney, Agent, or Firm — MH2 TECHNOLOGY LAW GROUP LLP

(57) ABSTRACT

Bus system comprising a first bus and a second bus, wherein the first bus is connected to the second bus through a bridge and a multiplexer. A first master has access to the second bus via the first bus, the bridge and the multiplexer. A second master has access to the second bus via the multiplexer. The bridge comprises an arbitration unit which is arranged to allow both a first master and a second master access to the second bus in such a way that no access is disturbed or lost.

14 Claims, 5 Drawing Sheets

(56) References Cited

U.S. PATENT DOCUMENTS

2012/0005386 A1* 1/2012 Yeem .................. G06F 13/4031
710/113
2013/0031284 A1* 1/2013 Yun ...................... G06F 13/364
710/105

OTHER PUBLICATIONS

Extended European Search Report in corresponding EP Application No. 19207730.3 dated Feb. 26, 2020, 7 pages.

* cited by examiner

BUS SYSTEM AND METHOD FOR OPERATING A BUS SYSTEM

CROSS-REFERENCE TO RELATED APPLICATIONS

The present application is the national stage entry of International Patent Application No. PCT/EP2020/080540, filed on Oct. 30, 2020, and published as WO 2021/089430 A1 on May 14, 2021, which claims the benefit of priority of European Patent Application No. 19207730.3, filed on Nov. 7, 2019, all of which are incorporated by reference herein in their entireties.

FIELD OF THE INVENTION

The present disclosure is related to a bus system and a method for operating a bus system.

BACKGROUND OF THE INVENTION

The bus system is a digital communication system, which transfers data between components inside a processing device, for example a computer, a mobile device, a portable watch or a tablet computer, or between multiple processing devices. The bus system may comprise multiple busses, wherein a second bus may be subordinated a first bus. The components between which data is transferred may comprise peripheral devices. Here and in the following peripheral devices which are connected to the first bus are referred to as first peripheral devices and peripheral devices which connected to the second bus are referred to as second peripheral devices.

The bus system may be based on a so called advanced micro controller bus architecture (AMBA), comprising an Advanced High-performance Bus (AHB) as the first bus and an Advanced Peripheral Bus (APB) as the second bus. The bus system is timed by means of a clock signal. Typically the AMBA defines and requires two clock cycles to access a second peripheral device via the AHB and the APB. Thus, only every second clock cycle the second peripheral device can be accessed. Thus, the maximum data rate on the APB is limited to 50% of the maximum data rate of the AHB. Most second peripheral devices utilize flops and synchronous memories as storage elements, wherefore the second peripheral devices may access the APB in a single clock cycle. Thus, in conventional APBs the second peripheral devices are in idle state for at least 50% of the time.

One of the purposes of the present bus system is to allow a higher data rate when transferring data through the bus system. A further purpose is to reduce the idle state time of second peripheral devices. These objects are achieved by the subject-matter of the independent claims.

SUMMARY OF THE INVENTION

The bus system comprises a first bus and a second bus. The first bus is connected to the second bus through a bridge and a multiplexer. A first master has access to the second bus via the first bus, the bridge and the multiplexer. A second master has access to the second bus via the multiplexer. The bridge comprises an arbitration unit which is arranged to determine, if the access to the second bus is granted to the first master or to the second master.

The arbitration unit may be arranged to coordinate the access of the first master and the second master to the second bus. For example, the arbitration unit is arranged to prevent the first and the second master from accessing the second bus simultaneously. Thereby the utilization of the transmission rate of the second bus is increased, which increases the data rate when transferring data through the bus system. Moreover, the increased utilization of the transmission rate of the second bus reduces the idle state time of second peripheral devices.

The bus system comprises a first bus with a first master and a second bus with a second master. For example, the first bus is an AHB and the second bus is an APB. The first master may be an AHB master and the second master may be an APB master. For example, the first and the second bus are each a parallel bus. The second master may provide a serial-to-parallel converted data of a serial bus, wherein the serial bus may be based on an I-Squared-C bus, a SPI bus or an UART bus. For example, an on-chip I-Squared-C slave is utilized as second master. The APB registers on the second bus can be accessed by an off-chip I-Squared-C master.

The first bus is connected to the second bus through a bridge and a multiplexer. The bridge translates a transmission (read or write) between the first and the second bus. For example, the bridge is a modified AHB to APB bridge, which translates an AHB bus transmission to an APB bus transmission. The bridge may have a fixed width to one word, which means it is not possible to write less bit than the width of the bridge. For example, it is not possible to write an 8-bit section of a 32-bit APB register. The bridge may act as a slave of the first bus, and as a master of the second bus. For example, the bridge comprises an arbitration unit which is arranged to determine, if the access to the second bus is granted to the first master or to the second master.

The first master has access to the second bus via the first bus, the bridge and the multiplexer. The second master has access to the second bus via the multiplexer. The multiplexer is arranged downstream of the bridge and the second master. The bridge controls the multiplexer, through which either the data of the first master or the second master is transferred to the second bus. In one particular embodiment, the bridge may be adapted to enable the second master access to the second bus at any time, regardless whether the first master accesses the second bus or not. The access to the second bus may be determined by means of the bridge without having an access mode bit in the address data sent by the first or the second bus. Advantageously, an increased data rate on the second bus is achieved. Furthermore, the idle state time of the peripheral device is reduced.

The second master may be arranged to control and monitor second peripheral devices, independently from the first master. For example, the second master is arranged to control and monitor registers connected to the second bus. For example, the second master reads data provided by the second peripheral device, to monitor the second peripheral device. For example the second master writes data to the second bus, which is read by the second peripheral device. Advantageously, the controlling and monitoring through the second bus improves the reliability by means of checking second peripheral devices. For example, second peripheral devices may be controlled during operation of the bus system, without accessing the first bus. Furthermore, the second master may advantageously be arranged to provide backdoor access to the second bus for test modes.

According to an embodiment the arbitration unit comprises a request input, a grant output and a ready output. The input and the outputs are interfaces for transmission of digital signals. The digital signals may have an activated state and a deactivated state, wherein the activated state may be represented by a logic value of 0 and the deactivated state may be represented by the logic value of 1, or vice versa.

The arbitration unit by default transmits a ready signal through the ready output to the first master. In particular, the arbitration unit is adapted to transmit a ready signal through the ready output to the first master. For example, the arbitration unit is adapted to set the ready signal to deactivated state, whenever access to the second bus is granted to the second master. The ready signal is set to the deactivated state one clock cycle after the access to the second bus is granted to the second master. The access of the second master to the second bus pauses the first master's access to the second bus.

The second master is adapted to transmit a request signal through the request input to the arbitration unit, and the arbitration unit is adapted to transmit a grant signal through the grant output to the second master. For example, the second master is adapted to set the request signal to the activated state before accessing the second bus. The arbitration unit is adapted to set the grant signal to the activated state, if access to the second bus is granted to the second master. The arbitration unit is adapted to set the grant signal to the activated state, at least 1 or 2 cycles of the clock signal after the request signal has been activated. The arbitration unit is adapted to set the grant signal to the deactivated state for 1 or 2 clock cycles, after the request signal has been deactivated.

Advantageously, the arbitration unit is adapted to centrally determine the access to the second bus, in order to avoid collisions of signals from the first and the second master on the second bus.

According to one embodiment, the grant output is connected to a select input of the multiplexer. The multiplexer is adapted to connect the first master to the second bus, when the grant signal is in the deactivated state, and the multiplexer is adapted to connect the second master to the second bus, when the grant signal is in the activated state. Advantageously the grant signal has multiple functions, firstly the grant signal controls the multiplexer to enable connection between the first master or the second master and the second bus, and secondly the grant signal indicates, if the second master may access the second bus.

According to one embodiment, the arbitration unit is adapted to halt and postpone the access of the first master to the second bus, if the first master addresses the peripheral device connected to the second bus while the grant signal is in the activated state. The arbitration unit may be adapted to establish the first master's access to the second bus after the second master's access to the second bus is finished. In particular, this is one clock cycle after grant signal has been deactivated For example, the arbitration unit stores the addressing of the second peripheral device and continues and completes the halted access. For example, the arbitration unit comprises a storage element, which caches the addressing data and transmission data sent by the first master to the second peripheral device. For example, the arbitration unit is arranged to set the ready signal to the deactivated state, whenever the grant signal is in the activated state. The ready signal is set to the activated state one clock cycle after the grant signal is set to the deactivated state. The first master is by default paused until the ready signal returns to the activated state. The arbitration unit may be adapted to provide the cached addressing data and transmission data to the second bus, after the grant signal is set to the deactivated state and the ready signal is set to the activated state. Advantageously, the ready signal ensures, that data sent through the second bus by the first master does not collide with data sent through the second bus by the second master. In other words, the bridge ensures that the first and the second master do not write/read data onto/from the second bus simultaneously. Thereby, loss of data is avoided and a high data rate through the second bus is enabled.

The bus system according to one of the embodiments defined above may be implemented in a noise cancellation enabled audio system, for example an active noise cancellation enabled audio system. The noise cancellation enabled audio system may be any ear mountable playback device of a noise cancellation enabled audio system and can e.g. include in-ear headphones or earphones, on-ear headphones or over-ear headphones. Instead of a headphone, the ear mountable playback device could also be a mobile phone or a similar device.

There is further provided a method for operating a bus system. For example, the bus system described here can be operated by the method. That is, all of the features disclosed for the bus system are also disclosed for the method and vice versa.

According to an embodiment of the method for operating a bus system, the bus system comprises a first master, a first bus, a second master and a second bus, wherein the first master accesses the second bus via the first bus and a bridge, the second master is connected to the second bus and the bridge, wherein the bridge has an arbitration unit, which grants either the first master or the second master access to the second bus.

The method comprises the steps of accessing the second bus by means of the first master through the first bus or by means of the second master, wherein the first bus and the second bus are timed by means of a common clock signal.

According to one embodiment the clock signal defines the address phase and the transmission phase. Successive clock cycles may define address phases and transmission phases alternatingly or in parallel to each other. For example, each access of the first master contains an address phase and a subsequent transmission phase.

During the address phase, the first master or the second master may send data which identifies a second peripheral device connected to the second bus, and to which or from which data is to be transmitted. During the transmission phase the data is transmitted between the second peripheral device addressed during the previous address phase and the master which has access to the second bus.

The second master may send data which identifies a second peripheral device connected to the second bus and transmit data from/to this peripheral device in the same clock cycle. This allows shorter access times for the second master whenever second peripherals do not contain asynchronous memories.

The arbitration unit may control the second master by means of a grant signal. For example, address and transmission data is transmitted between the second master and the peripheral device only when the grant signal is in the activated state. For example, the grant signal is in the deactivated state by default. The grant signal may be in the activated state the first or second clock cycle after the second master has sent a request to the arbitration unit, by setting the request signal in the activated state. The arbitration unit allows the second master to access to the second bus, even if the second bus is addressed or data is transmitted between the first master and the second peripheral device through the second bus. The arbitration unit will pause the first master access to the second bus until the access by the second master is completed.

The arbitration unit postpones the access of the first master to the second bus, if the first master addresses a second peripheral device while the second master accesses the second bus. For example, the arbitration unit provides a ready signal, which pauses the first master when the ready signal is in the deactivated state. For example, the ready signal is in the activated state by default. If the first master addresses the peripheral device connected to the second bus, the arbitration unit activates the ready signal for one clock cycle after the address has been transmitted. If the second master also accesses the second bus while the first master accesses the second bus, the arbitration unit may prolong the deactivated state of the ready signal by one or two more clock cycles.

According to one embodiment of the method the first master may access the first peripheral device, while the second master may access the second peripheral device simultaneously.

When the ready signal is in the deactivated state, the addressing of first master to the peripheral device is stored until the ready signal is set back to the activated state. The ready signal is in the activated state after the access of the second master to the second bus is finished.

In other words, the arbitration unit grants the first master accesses to the peripheral device through the second bus after the access of the second master is finished.

According to an aspect of the proposed principle, the second master uses the idle time of the access by the first master to access the second bus. By doing this, the original idle state time will drop depending on the number of accesses from this second master. This will improve the system performance.

In other words, the access of the second master is performed, using the idle time of the access by the first master to the second bus, to access the second bus.

According to an embodiment, the timing gaps in the APB bus protocol are used to achieve higher data throughput than the default APB protocol offers.

According to another aspect of the proposed principle, the second master can operate autonomously, i.e. independent from any control performed by the first master.

Further advantages and advantageous refinements and further developments of the bus system and the method for operating the bus system result from the following exemplary embodiments illustrated in conjunction with the Figure.

The same, similar or equivalent elements are provided in the Figure with the same reference numerals. The Figure and the proportions of the elements shown in the Figure with each other are not to be considered to scale. On the contrary, individual elements can be exaggerated in size for better presentation and/or better intelligibility.

DETAILED DESCRIPTION

Figure 1:
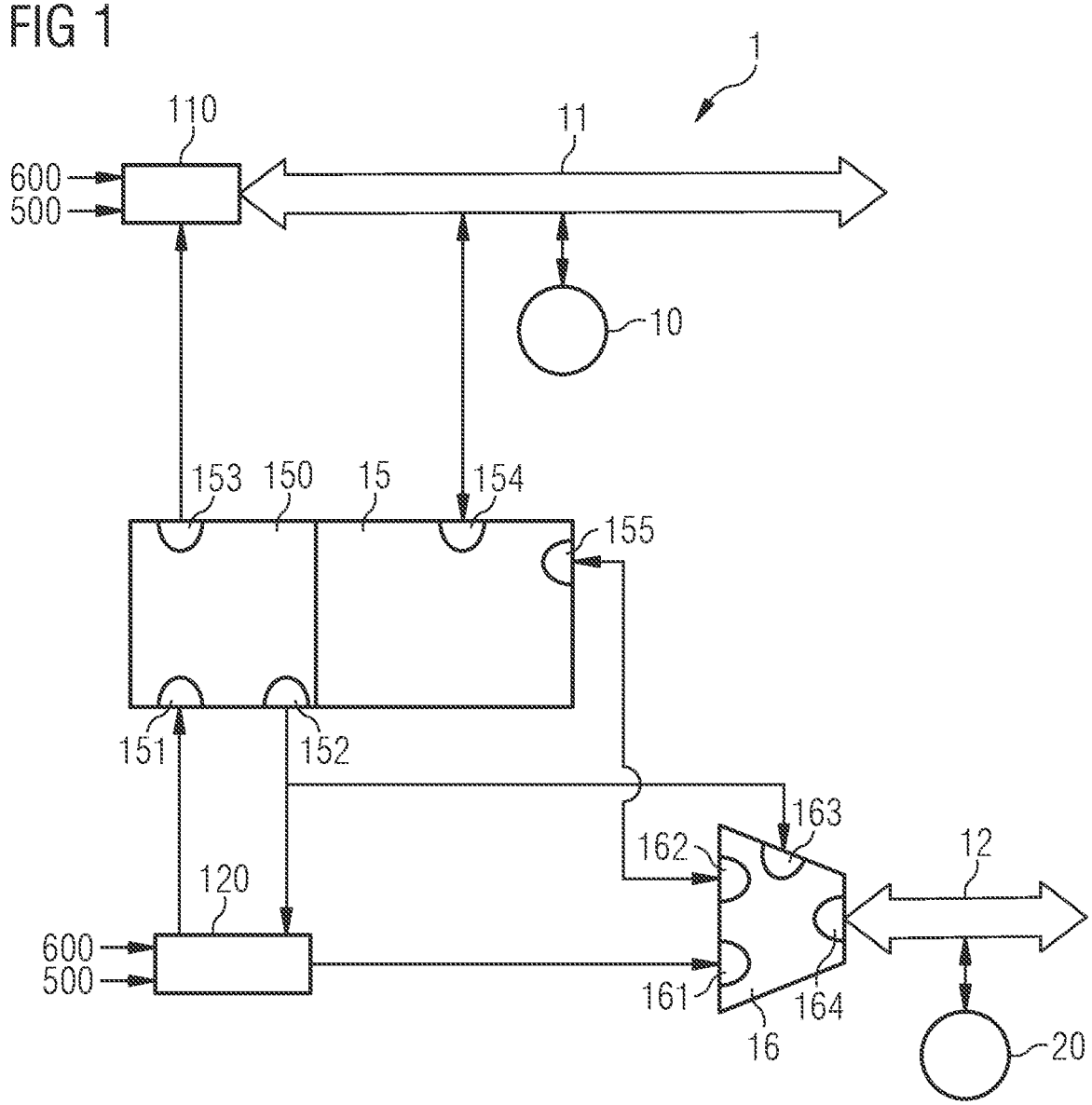
FIG. 1 depicts an exemplary bus system in accordance with the present disclosure.

FIG. 1 shows a schematic view of an exemplary embodiment of a bus system 1. The bus system 1 comprises a first bus 11 with a first master 110, a second bus 12 with a second master 120, a bridge 15 and a multiplexer 16. The bus system 1 arranged to transfer data between the first master 110 and first 10 and/or second 20 peripheral devices. The bus system 1 arranged to transfer data between the second master 120 and second 20 peripheral devices. The data may respectively be supplied to the first master 110 and/or the second master 120 via their respective data input 600. Each data input 600 may carry a separate signal. The data is transferred via the first bus 11 and/or the second bus 12. To time the access to the second bus 12, signals are transmitted between the first master 110 and the bridge 15, the second master 120 and the bridge 15 and the multiplexer 16 and the bridge 15. In the exemplary embodiments, digital signals having the logic value 1 are referred to as being in activated state and digital signals having the logic value 0 are referred to as being in deactivated state.

The first 110 and the second 120 bus masters are arranged to access the second bus 12. Accessing a bus comprises addressing and transmitting data to or from a peripheral device 10, 20 connected to the bus 11, 12 which is being accessed. The bus system 1 comprises a first peripheral device 10 which is connected to the first bus 11 and a second peripheral device 20 which is connected to the second bus 12. The first and the second peripheral devices 10, 20 are for example registers, memory units, sensors or actuators.

The bridge 15 comprises an arbitration unit 150 which determines if the first 110 or the second 120 master has access to the second bus 12. The bridge comprises a request input 151 and a grant output 152. The second master 120 is connected to the request input 151. The second master 120 is arranged to send a request signal 151a to the arbitration unit 150 before sending data to the second bus 12. By default, the request signal 151a is in the deactivated state. The arbitration unit 150 returns a grant signal 152a through the grant output 152. Depending on whether the second bus is currently being accessed, the grant signal 152a is either in the activated state or in the deactivated state. By default the grant signal 152a is in the deactivated state.

The grant output 152 is connected to a select input 163 of the multiplexer 16. If the grant signal 152a is in the activated state, a first port 161 of the multiplexer is coupled to a bus port 164 of the multiplexer. If the grant signal 152b is in the deactivated state, a second port 162 of the multiplexer 16 is coupled to the bus port 164. Through the bus port 164 of the multiplexer 16, data is transmitted to or from the second bus 12.

The bridge 15 comprises a ready output 153 which is arranged to send a ready signal 153a to the first master 110. If the ready signal 153a is in the activated state, the first master 110 is in normal operating mode and reads and writes data through the first bus 11. If the ready signal is in the deactivated state, the first master 110 is paused and does not read and not write data through the first bus until the ready signal 153a becomes set in the activated state. By default the ready signal 153a is in the activated state.

The bridge 15 comprises a first data link 154 and a second data link 155. In particular the first bus 11 and the first data link 154, and the second data link 155 and the second port 162 are connected by means of further busses. The bridge 15 is arranged to read and write data through the first data link 154 on the first bus 11. The bridge 15 is arranged to read and write data through the second data link 155 on the second bus 12.

The bus system 1, for example the first bus 11 and the second bus 12 are timed by means of a clock signal 500. The clock signal 500 is applied to the first master 110 and to the second master 120. For example, the first bus 11 and the second bus 12 are timed by means of a common clock signal 500. The clock signal defines an addressing phase 501 and a transmission phase 502. During the addressing phase 501 the first 110 and/or the second 120 master write data onto the first 11 and/or second 12 bus, wherein the data identifies a peripheral device 10, 20. During the transmission phase 502 the peripheral device 10, 20 reads or writes data from or to the first 11 and/or the second 12 bus.

In the method for operating the bus system 1, the second bus 12 is either accessed by means of the first master 110 through the first bus 11, the bridge 15 and the multiplexer 16 or by means of the second master 120 through the multiplexer 16. The first 110 and/or the second 120 master addresses the second peripheral device during the address phase 501.

In order to address the second peripheral device 20, the first master 110 writes address data of the second peripheral device 20 to the first 11. The bridge 15 transfers the address data through the first data link 154 and the second data link 155 to the second port 162 of the multiplexer 16. If the second master 120 does not have access to the second bus 12, the grant signal 152a is in the deactivated state and the multiplexer 16 transfers the address data from the first master 110 to the second bus 12. The address data from the first master 110 reaches the second peripheral device 20. If the second master 120 has access to the second bus 12 while the first master 110 addresses the second peripheral device 20, the ready signal 153a remains in the deactivated state for one or two more clock cycles when first master has started a write/read access. The deactivated state ready signal 153a halts the first master 110 until the ready signal 153a is set to the activated state. The arbitration unit 150 sets the ready signal 153a to activated state after the second master 120 has finished accessing the second bus 12. The first master 110 accesses the second bus 12, after the second master has finished accessing the second bus 12.

In order to access the second bus 12, the second master 120 sets the request signal 151a to activated state. If the first master 110 does not access the second bus 12, the arbitration unit 150 sets the grant signal 152a to activated state. After having received the activated state grant signal 152a, the second master 120 sends address data to the first port 161 of the multiplexer 16. The activated state grant signal 163a is transmitted to the select input 163 of the multiplexer 16. Thereby, the multiplexer 16 transfers the address data from the second master 120 through the first port 161 and the bus port 164 to the second bus 12.

Figure 2:
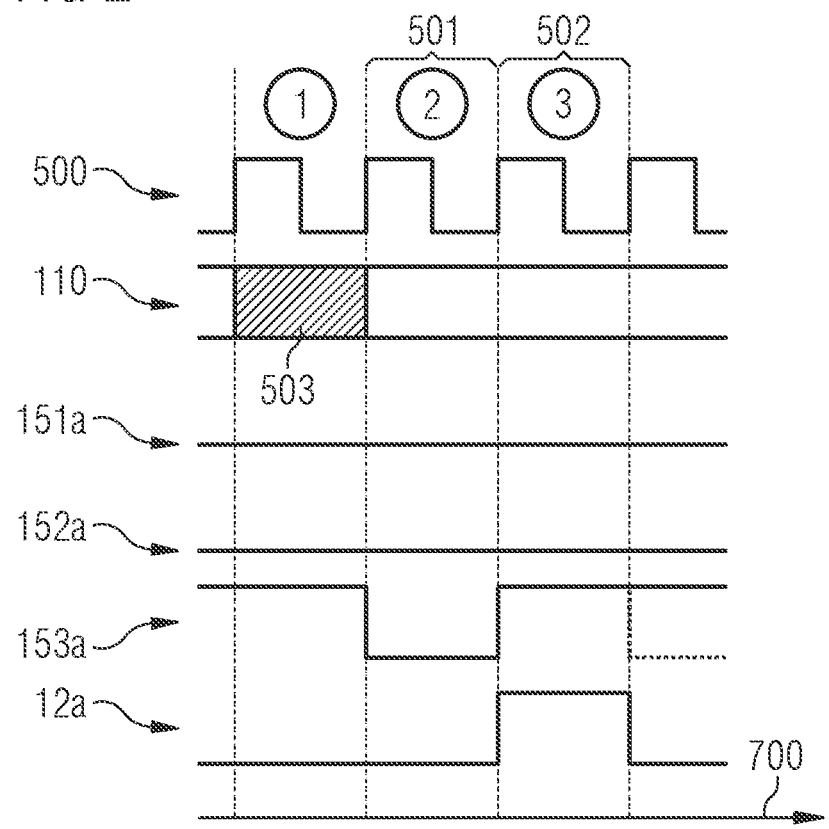
FIG. 2 depicts an exemplary timing diagram for a bus system in accordance with the present disclosure.

FIG. 2 shows a timing diagram of an exemplary embodiment of the bus system. The timing diagram shows the timing of different signals within the bus system during the time 700. In FIG. 2 the diagram illustrates an access of the first master 110 to the second bus 12. During a first cycle 1 of the clock signal 500 the first master 110 sends address data 503 to the first bus 11.

If address data 503 is a valid address for a second peripheral device 20, the bridge 15 deactivates ready signal 153a during a second clock cycle 2, which is the address phase 501. This will pause the first master 110 during the second clock cycle 2. In the address phase 501, the bridge 15 links the first bus 11 and the second bus 12.

In a third clock cycle 3, the bus system is in transmission phase 502. In this clock cycle 3 the bridge activates a bus enable signal 12a on the second bus 12, which enables data transmission through the second bus 12. The enable signal 12a activates both address and data link for read or write access from/to the first master 110 to the second bus 12.

Figure 3:
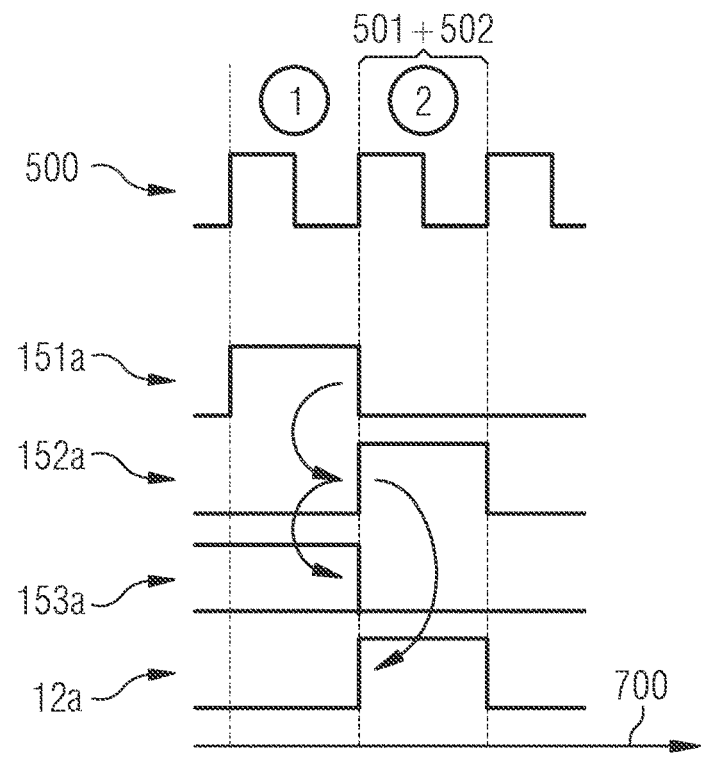
FIG. 3 depicts an exemplary timing diagram for a bus system in accordance with the present disclosure.

FIG. 3 shows a timing diagram of an exemplary embodiment of the bus system. The timing diagram shows the timing of different signals within the bus system during the time 700. In the embodiment shown in FIG. 3, the second master 120 accesses the second bus 12 within one clock cycle. In this embodiment the address phase 501 and transmission phase 502 are combined.

In a first clock cycle 1, the second master 120 requests access by activating the request signal 151a. In the second clock cycle 2, the request signal 151a causes the bridge 15 to activate the grant signal 152a. If the first master 110 solely performs a write access to a second peripheral device 20, the grant signal 152a is activated in the second cycle 2. The activated grant signal 152a activates the bus enable signal 12a on the second bus for one clock cycle. The bus enable signal 12a will activate both address and data link for read or write access from/to the second master 120 to the second bus 12.

Figure 4:
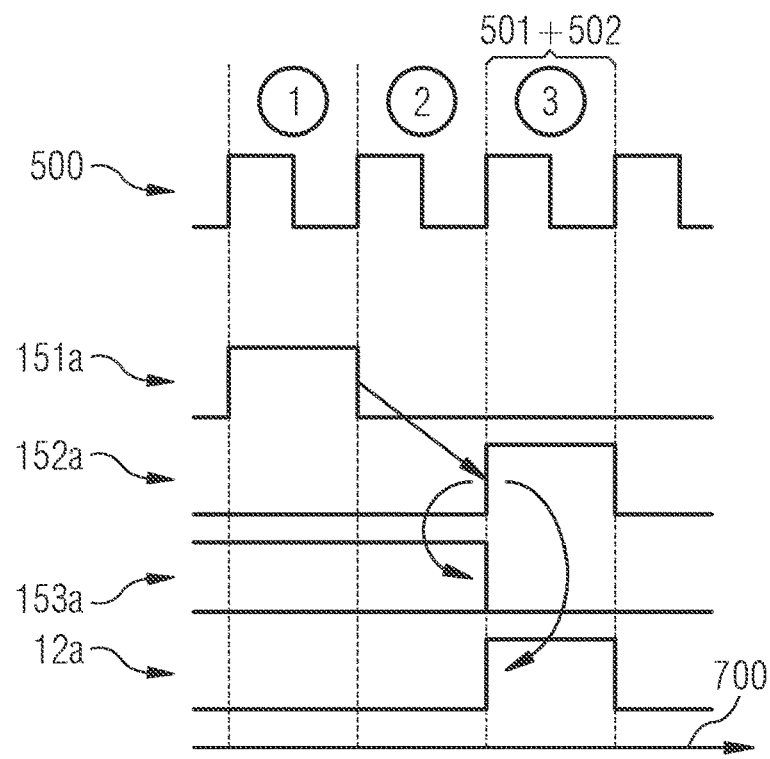
FIG. 4 depicts an exemplary timing diagram for a bus system in accordance with the present disclosure.

FIG. 4 shows a timing diagram of an exemplary embodiment of the bus system. The timing diagram shows the timing of different signals within the bus system during the time 700. In the embodiment shown in FIG. 4, the second master 120 accesses the second bus 12 within one clock cycle. In this embodiment the address phase 501 and transmission phase 502 are combined.

In a first clock cycle 1, the second master 120 requests access by activating the request signal 151a. In the third clock cycle 3, the request signal 151a causes the bridge 15 to activate the grant signal 152a. If the first master 110 solely performs a read access to a second peripheral device 20, the grant signal 152a is not activated in the second cycle to allow the first master to complete the read access to the second peripheral 20. The grant signal is activated in the third cycle 3. The activated grant signal 152a activates the bus enable signal 12a on the second bus for one clock cycle. The bus enable signal 12a will activate both address and data link for read or write access from/to the second master 120 to the second bus 12.

Figure 5:
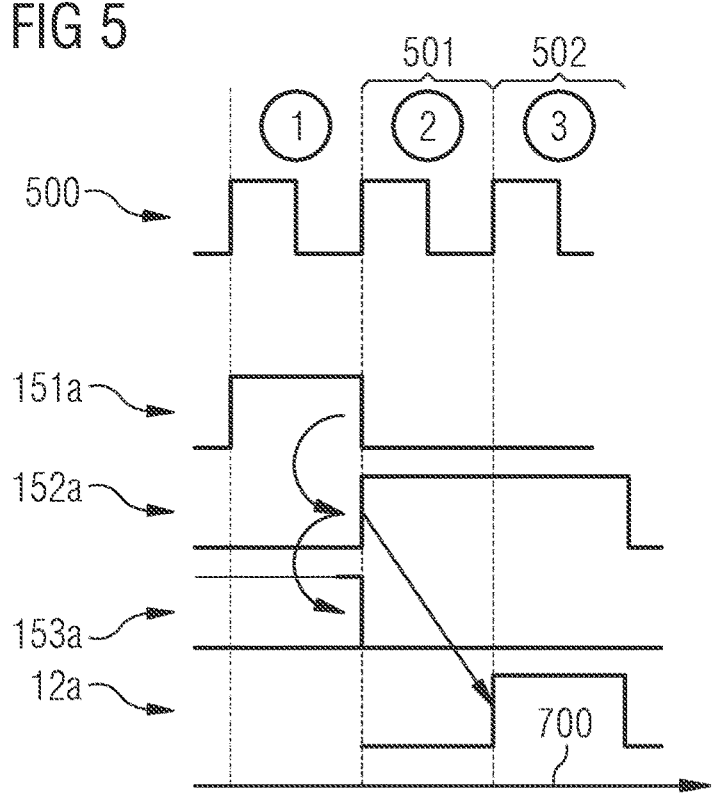
FIG. 5 depicts an exemplary timing diagram for a bus system in accordance with the present disclosure.
Figure 6:
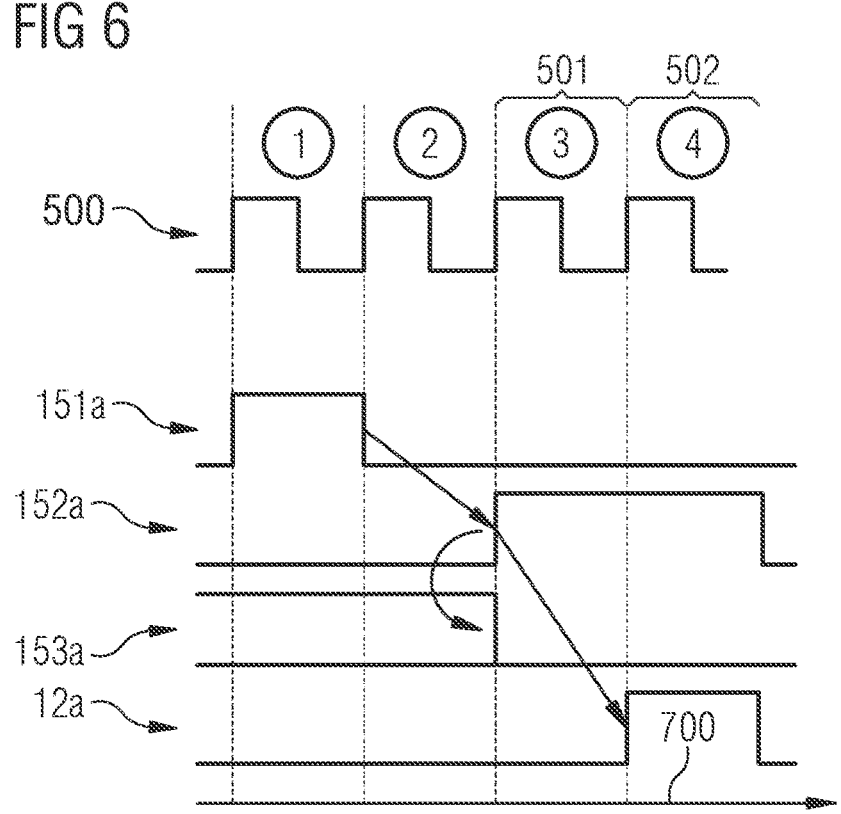
FIG. 6 depicts an exemplary timing diagram for a bus system in accordance with the present disclosure.

The FIGS. 5 and 6 show alternative timing diagrams to FIGS. 3 and 4.

FIG. 5 shows a timing diagram of an exemplary embodiment of the bus system. The timing diagram shows the timing of different signals within the bus system during the time 700. In the embodiment in FIG. 5 the second master 120 accesses the second bus 12 within two clock cycles, namely the address phase 501 and the pursuant transmission phase 502.

In the first clock cycle 1 the second master 120 requests access by activating the request signal 151a.

In the second 2 and third 3 clock cycle, the request signal 151a causes the bridge 15 to activate the grant signal 152a signal. The grant signal 152a is activated in the second clock cycle 2, if the first master 110 solely performs a write access to the second peripheral device.

The activated grant signal 152a lasts two clock cycles and activates the bus enable signal 12a on the second bus 120 in the third clock cycle 3. In clock cycle 2 the address and data link for a read or write access from/to the second bus 12 is enabled. The bus enable signal 12a activates both address and data link for read or write access from/to the second master 120 to the second bus 12.

FIG. 6 shows a timing diagram of an exemplary embodiment of the bus system. The timing diagram shows the timing of different signals within the bus system during the time 700. In the embodiment in FIG. 6 the second master 120 accesses the second bus 12 within two clock cycles, namely the address phase 501 and the pursuant transmission phase 502.

In the first clock cycle 1 the second master 12 requests access by activating the request signal 151a.

In the third 3 and fourth 4 clock cycle the request signal 151a causes the bridge 15 to activate the grant signal 152a signal. The grant signal 152a is activated in the third clock cycle 2, if the first master 110 solely performs a read access from a second peripheral device 20.

The activated grant signal 152a lasts two clock cycles and activates the bus enable signal 12a on the second bus 120 in the fourth clock cycle 4. In clock cycle 3 the address and data link for a read or write access from/to the second bus 12 is enabled. The bus enable signal 12a activates both address and data link for read or write access from/to the second master 120 to the second bus 12.

Figure 7:
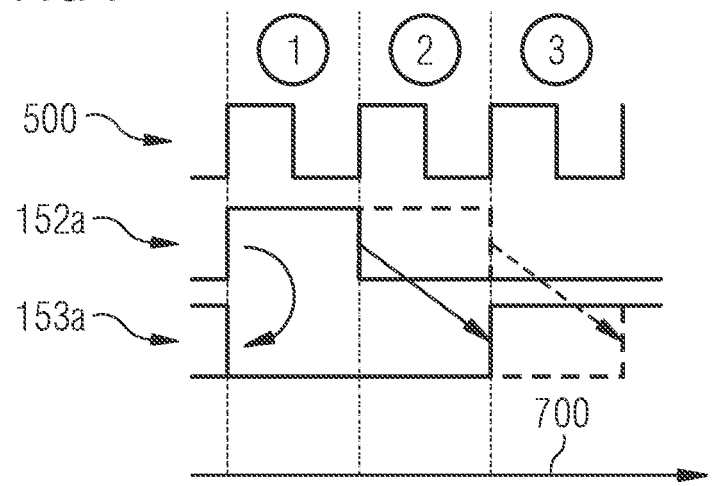
FIG. 7 depicts an exemplary timing diagram for a bus system in accordance with the present disclosure.

FIG. 7 shows a timing diagram of an exemplary embodiment of the bus system. In particular, FIG. 7 illustrates the dependency of the ready signal 153a on the grant signal 152a. In the first clock cycle 1 the bridge 15 deactivates the ready signal 152a while the grant signal 152a is activated. If the grant signal 152a is deactivated within the first clock cycle 1, the bridge 15 keeps the ready signal 153a de-activated until the end of the second clock cycle 2. If the grant signal 152a is deactivated within the second clock cycle 2 (dashed lines), the bridge 15 keeps the ready signal 153a deactivated until the end of the third clock cycle 3 (dashed lines). Thus the bridge 15 keeps the ready signal 153a deactivated for the duration of one additional clock cycle, after the grant signal 152a is being deactivated.

Figure 8:
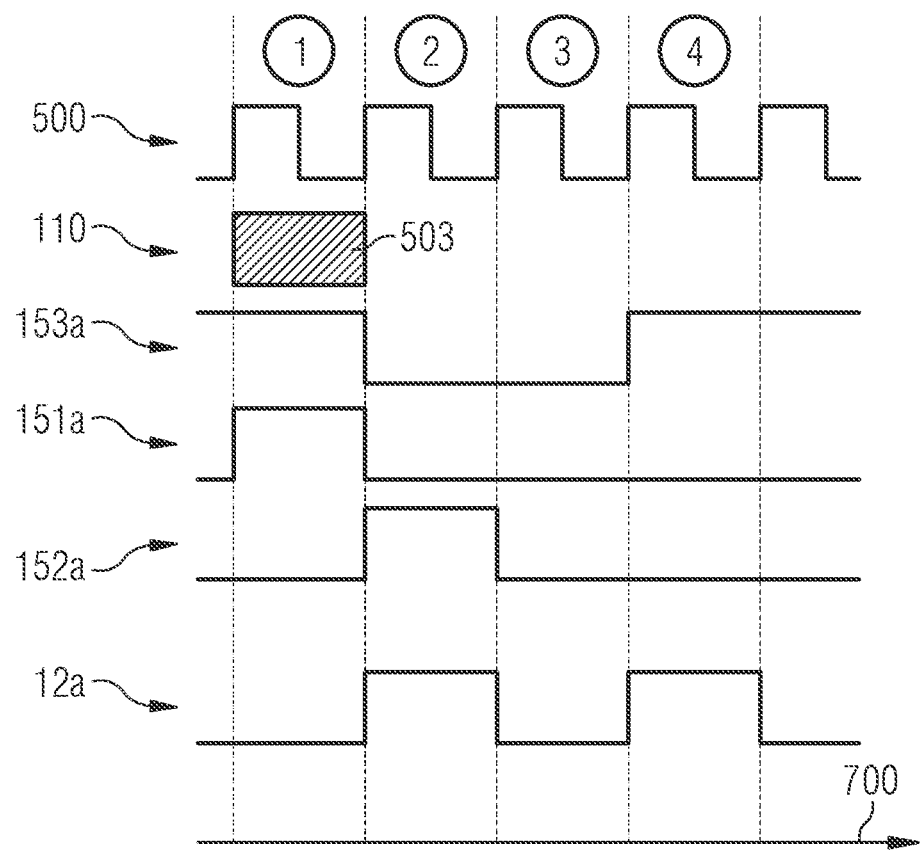
FIG. 8 depicts an exemplary timing diagram for a bus system in accordance with the present disclosure.

FIG. 8 shows a timing diagram of an exemplary embodiment of the bus system. In this embodiment, both first master 110 and second master 120 try to access the second bus 12 within the first clock cycle 1.

In the first lock cycle 1, the first master 110 starts a write access by applying address 503 to the first bus 11. The second master 120 also starts an access in the first clock cycle 1, by activating the request signal 151a.

In the second clock cycle 2, the first master 110 has started a write access, so the grant signal 152a and the enable signal 12a are being activated within the second cycle 2. This chronologic sequence is similar to the sequence described in FIG. 3. The activated grant signal 152a activates the bus enable signal 12a on the second bus 12, which activates both address and data link for a read and write access from the second master 120 to the second bus 12. The address 503, which is sent by the first master 110 is stored by the bridge 15.

In the third clock cycle 3, the ready signal 153a is still de-activated, which pauses the first master 110. The bridge 15 sends the previously stored address 503 from the first master 110 to the second bus 12.

In the fourth clock cycle 4 the bridge 15 activates the bus enable signal 12a on the second bus 12, which activates both address and data link for the read access to the first master 110 to the second bus 12.

The invention claimed is:

1. A bus system comprising a first bus and a second bus, wherein
the first bus is connected to the second bus through a bridge and a multiplexer, wherein the second bus is an advanced peripheral bus (APB),
a first master has access to the second bus via the first bus, the bridge and the multiplexer, wherein the first master is an advanced high-performance bus (AHB) master,
a second master has access to the second bus via the multiplexer, wherein the second master is an APB master, and
the bridge comprises an arbitration unit which is arranged to determine, if the access to the second bus is granted to the first master or to the second master, wherein the arbitration unit is arranged to prevent the first master and the second master from accessing the second bus simultaneously, such that the utilization of the transmission rate of the second bus is increased, which reduces the idle state time of peripheral devices connected to the second bus, and wherein the second master is arranged to control and monitor the peripheral devices connected to the second bus, independently from the first master.

2. The bus system according to claim 1, wherein the arbitration unit controls the multiplexer.

3. The bus system according to claim 1, wherein
the arbitration unit comprises a request input, a grant output and a ready output,
the arbitration unit is adapted to transmit a ready signal through the ready output to the first master,
the second master is adapted to transmit a request signal through the request input to the arbitration unit, and the arbitration unit is adapted to transmit a grant signal through the grant output to the second master.

4. The bus system according to claim 3, wherein
the grant output is connected to a select input of the multiplexer,
the multiplexer is adapted to connect the first master to the second bus, when the grant signal is in a deactivated state,
the multiplexer is adapted to connect the second master to the second bus, when the grant signal is an activated state.

5. The bus system according to claim 3, wherein the arbitration unit is adapted to set the ready signal in the deactivated state or prolong the deactivated state of signal ready, when the second master has access to the second bus.

6. The bus system according to claim 5, wherein
the arbitration unit is adapted to halt and postpone the access of the first master to the second bus, if the first master addresses a second peripheral device connected to the second bus while the second master has access to the second bus, and
the arbitration unit is adapted to establish the first master's access to the second bus after the second master's access to the second bus is finished.

7. The bus system according to claim 1, wherein the first bus and the second bus are each a parallel bus.

8. A noise cancellation enabled audio system, in particular a headphone, comprising the bus system according to claim 1.

9. A method for operating a bus system comprising a first master, a first bus, a second master and a second bus, wherein
the first master accesses the second bus via the first bus and a bridge, wherein the first master is an advanced high-performance bus (AHB) master, the second master is connected to the second bus and the bridge, wherein the second master is an advanced peripheral bus (APB) master, and wherein the second bus is an APB, the bridge has an arbitration unit, which grants either the first master or the second master access to the second bus, wherein the arbitration unit is arranged to prevent the first master and the second master from accessing the second bus simultaneously, such that the utilization of the transmission rate of the second bus is increased, which reduces the idle state time of peripheral devices connected to the second bus, and wherein the second master is arranged to control and monitor the peripheral devices connected to the second bus, independently from the first master.

10. The method according to claim 9 comprising the steps of accessing the second bus by means of the first master through the first bus or by means of the second master, wherein the first bus and the second bus are timed by means of a common clock signal.

11. The method according to claim 10, wherein the clock signal defines an address phase and an transmission phase, wherein the first master and/or the second master addresses the second peripheral device during the address phase, and data is transmitted between the first master or the second master and the second peripheral device during the transmission phase.

12. The method according to claim 11, wherein wherein the arbitration unit grants the second master access to the second bus during the address phase and during the transmission phase, if the first master does not access the second bus, and the arbitration unit grants the first master access to the second bus during the address phase and during the transmission phase (, if the second master does not access the second bus.

13. The method according to claim 9, wherein the arbitration unit pauses the first master access to the second bus, whenever the second master requests access to the second bus.

14. The method according to claim 9, wherein the arbitration unit postpones the access of the first master to the second bus, if the first master addresses the second peripheral device which is connected to the second bus while the second master accesses the second bus, and the addressing of the first master to the second peripheral device is stored until after the access of the second master to the second bus is finished, and the arbitration unit grants the first master accesses to the second peripheral device through the second bus after the access of the second master is finished.

* * * * *